(12) United States Patent
Wu et al.

(10) Patent No.: US 6,974,221 B2
(45) Date of Patent: Dec. 13, 2005

(54) SUPPORT FOR BACKLIGHT MODULE

(75) Inventors: Chih-Kang Wu, Longtan (TW);
Ming-Fa Wang, Jhunan (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 10/748,601

(22) Filed: Dec. 30, 2003

(65) Prior Publication Data

US 2005/0146898 A1 Jul. 7, 2005

(51) Int. Cl.[7] ............................................. G01D 11/28
(52) U.S. Cl. ........................... 362/29; 362/30; 362/97; 362/260; 362/634; 349/70
(58) Field of Search ............................. 362/31, 29–30, 362/260, 97, 614, 634; 349/65, 70

(56) References Cited

U.S. PATENT DOCUMENTS

| 5,064,276 A | * | 11/1991 | Endo et al. .................... 349/64 |
| 5,394,314 A | * | 2/1995 | Evanisko ...................... 362/216 |
| 6,050,700 A | * | 4/2000 | Satterfield ................... 362/216 |
| 6,471,388 B1 | * | 10/2002 | Marsh .......................... 362/559 |
| 6,722,773 B2 | * | 4/2004 | Tsai et al. .................... 362/216 |
| 6,747,404 B2 | * | 6/2004 | Rha ............................. 313/491 |
| 2002/0044437 A1 | * | 4/2002 | Lee .............................. 362/31 |
| 2002/0113924 A1 | * | 8/2002 | Saito et al. .................. 349/112 |
| 2004/0012763 A1 | * | 1/2004 | Yu et al. ...................... 353/122 |
| 2004/0156185 A1 | * | 8/2004 | Wu .............................. 362/31 |

FOREIGN PATENT DOCUMENTS

JP 10-326517 12/1998

* cited by examiner

Primary Examiner—Stephen Husar
Assistant Examiner—Jason Han
(74) Attorney, Agent, or Firm—Duane Morris LLP

(57) ABSTRACT

A backlight assembly for a liquid crystal display panel, including a lamp housing; a lamp; a diffuser plate; and a plurality of supports. The supports each has first and second members. The first member has a body and a groove formed in the body for holding the lamp and attaching the lamp to the lamp housing. A ring-shape member may be disposed about a section of the lamp for providing cushioning between the lamp and the first member. The second member has an elongated body for supporting the diffuser plate when it attempts to sag or distort.

36 Claims, 5 Drawing Sheets

SUPPORT FOR BACKLIGHT MODULE

FIELD OF THE INVENTION

The present invention relates to a liquid crystal display, and more particularly, to a backlight assembly for a liquid crystal display with a support structure that integrates a lamp holder with a diffuser plate prop.

BACKGROUND OF THE INVENTION

One type of flat panel display is a liquid crystal display (LCD). LCDs are finding increasing use in laptop and desktop computers, as large monitors of 30 inches or greater, and as wall-mount TVs.

Most LCDs require an illumination source, or backlight assembly, for backlighting the LCD panel so that an image displayed on the LCD panel can be observed by a viewer. Backlight assemblies may be classified into two types: edge type and direct type. Direct type backlight assemblies are typically used in large sized LCDs of 30 inches or greater.

The direct type backlight assembly typically includes a plurality of cylindrical-shape lamps, a reflector sheet and a diffuser plate. The reflector sheet reflects light irradiated from the lamps in the display area so as to avoid loss of light. The diffuser plate diffuses light in an upper portion of the lamps to emit uniform light.

One problem associated with conventional backlight assemblies, especially those sized for use in large sized LCDs, is that the diffuser plate and the lamps tend to sag and/or deform due to their large size. Specifically, the large diffuser plate tends to sag because it is relatively heavy compared to its thickness, which is typically only about 2 to 3 mm. In addition, the heat of the lamps and moisture from the environment tend to cause the diffuser plate to deform. The lamps tend to sag and/or deform because they usually have a length of 30 inches or longer and a diameter of only about 3 to 4 mm. The sagging and/or deformed diffuser plate and/or lamps produce a non-uniform light, which undesirably causes dark and bright spots in the image displayed on the LCD panel.

To prevent the diffuser plate from sagging, various types of structures have been developed in the prior art. For example, spacer pin structures have been developed, which extend between the diffuser plate and the reflection sheet to prevent the diffuser plate from sagging and deforming. However, these spacer pin structures do not address the sagging and deforming lamp problem.

Other structures have been developed in the prior art, which attempt to address both the sagging diffuser plate and the sagging lamp problem. These supporting structures combine a lamp holder with a spacer pin structure. One difficulty with these structures is that lamp breakage can occur because the lamps are seated directly on rigid lamp holder portions. Moreover, external impacts or oscillations experience by the LCD display can cause the lamps to escape from the holders.

Accordingly, a lamp holder and diffuser plate support structure for LCD backlight assemblies is needed that overcomes the deficiencies of the prior art.

SUMMARY OF THE INVENTION

A backlight assembly is disclosed for a liquid crystal display panel. The backlight assembly includes a lamp housing; a lamp; a diffuser plate; and a plurality of supports. The supports each has first and second members. The first member has a body and a groove formed in the body for holding the lamp and attaching the lamp to the lamp housing and a ring-shape member may be disposed about a section of the lamp for providing cushioning between the lamp and the first member. The second member has an elongated body for supporting the diffuser plate when it attempts to sag or distort.

DETAILED DESCRIPTION OF THE INVENTION

Figure 1A:
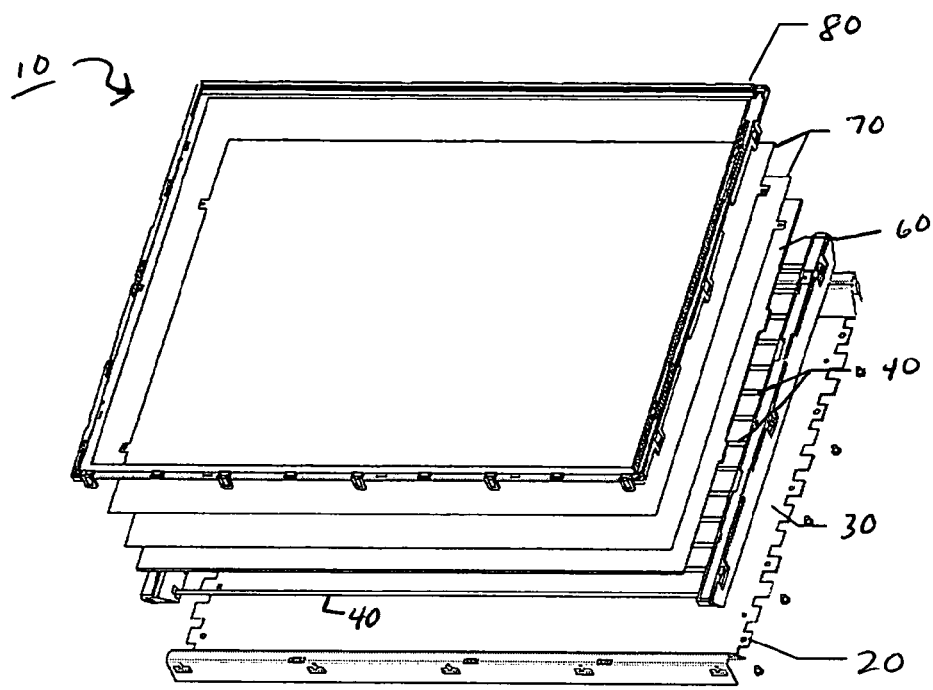
FIG. 1A is an exploded perspective view of an illustrative embodiment of a direct-type LCD backlight assembly.
Figure 1B:
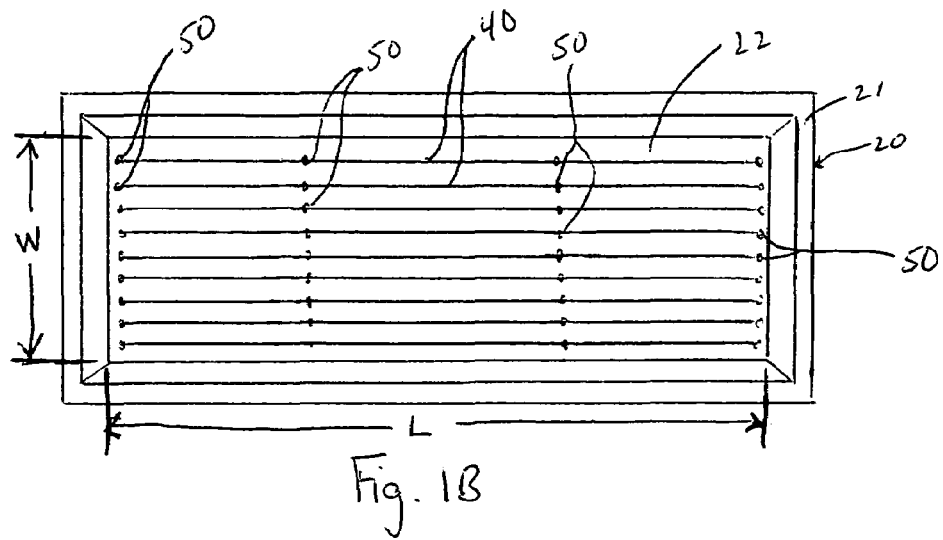
FIG. 1B is a plan view of a lamp housing of the backlight assembly of FIG. 1A.

FIGS. 1A and 1B collectively show an illustrative embodiment of a direct-type LCD backlight assembly 10. The backlight assembly 10 includes a lamp housing 20, a reflector sheet 30, one or more lamps 40, a plurality of supports 50 each of which integrates a lamp holder with a diffuser plate prop (FIG. 1B), a diffuser plate 60, one or more optical films 70, and a frame member 80. The backlight assembly 10 is adapted to secure a liquid crystal display (LCD) panel and circuit parts (not shown).

Figure 2:
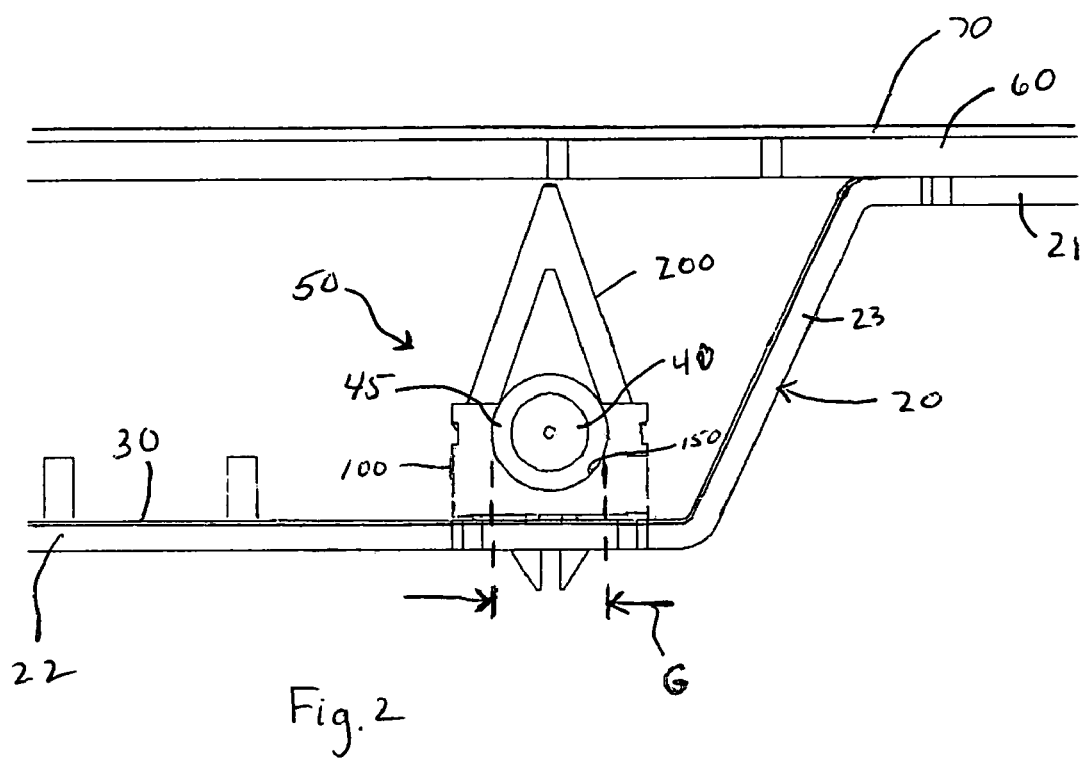
FIG. 2 is a sectional of the lamp housing of the backlight assembly showing a first illustrative embodiment of a lamp holder and diffuser panel support.

As shown in FIG. 2, the lamp housing 20 comprises a peripheral mounting flange 21 and a bottom wall 22 which is spaced from the plane of the mounting flange 21 by inclined side walls 23. The reflector sheet 30 is disposed on the inner surfaces of the lamp housing walls 22 and 23, and reflects light irradiated from the lamps 40 to maximize the light output of the assembly 10. The diffuser plate 60 is mounted over the lamps 40 on the mounting flange 21 of the lamp housing 20 and diffuses light irradiated from the lamps 40 to generate a uniform light pattern. The optical film 70 is disposed over the diffuser plate 60 and enhances the brightness of the diffused light. The optical film 70 may be omitted to reduce the cost of the backlight assembly in applications where enhanced light brightness is not essential.

The number of lamps 40 utilized in the backlight assembly 10 generally depends upon the size of the backlight assembly. The size of the backlight assembly generally corresponds to the size of LCD panel for which the backlight assembly is intended to be used for. For example, 12–16 lamps may be used in a backlight assembly sized for a 20 inch LCD panel, 16–18 lamps may be used in the backlight assembly sized for a 30 inch LCD, and 25–30 lamps may be used in a backlight assembly sized for a 46 inch LCD panel.

Figure 3:
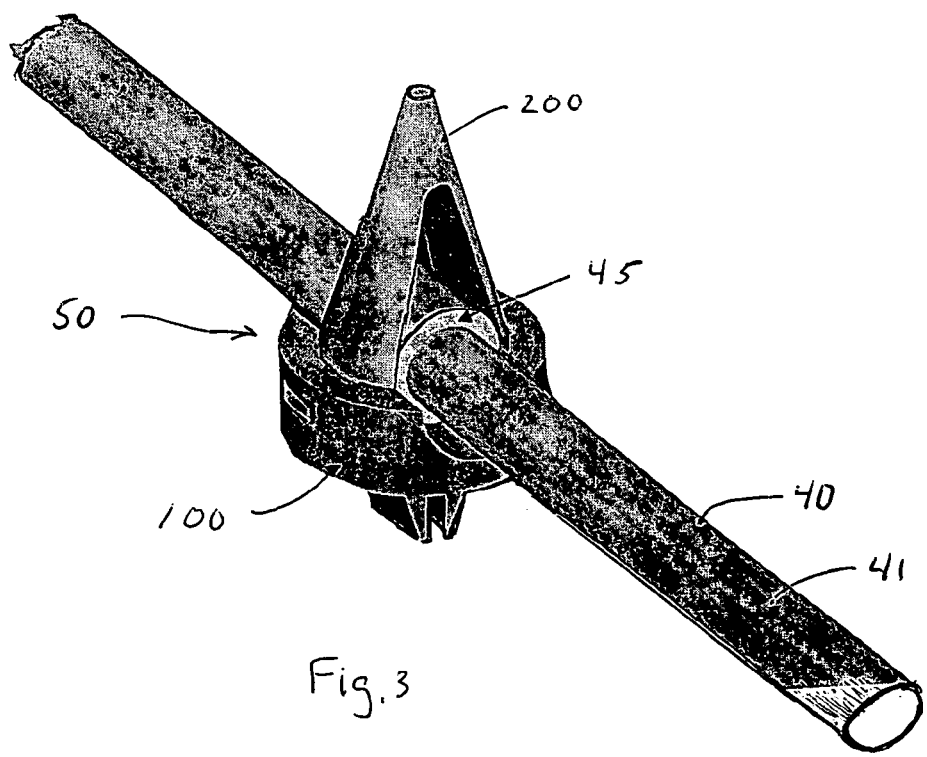
FIG. 3 is a perspective view of the lamp holder and diffuser panel support shown in FIG. 2 and lamp.

Referring to FIG. 3, each lamp 40 comprises an elongated, cylindrical lamp body 41. The lamps 40 may be cold or hot cathode fluorescence type lamps.

As shown in FIG. 1B, the lamps 40 may extend across the width W of the lamp housing bottom wall 22 and may be parallel spaced from one another along the length L of the bottom wall 22 at constant intervals. One or more lamp holder and diffuser plate (LHDP) supports 50 are used for securely attaching the lamps 40 to the bottom wall 22 of the lamp housing 20 and supporting the diffuser plate 60 when it attempts to sag or distort. The exact number of LHDP supports 50 depends upon the length and width of the diffuser plate 60 (which has approximately the same length and width as the corresponding LCD panel) and the length of the lamps 40. The LHDP supports 50 are provided at optimal positions to support the diffuser plate 60 and hold the lamps 40 without sagging and/or distortion. In one illustrative embodiment, a backlight assembly for a 26–30 inch LCD panel may utilize approximately 4 LHDP supports. In another illustrative embodiment, a backlight assembly for 37 inch LCD panel may utilize about 14 to about 16 LHDP supports.

Figure 5A:
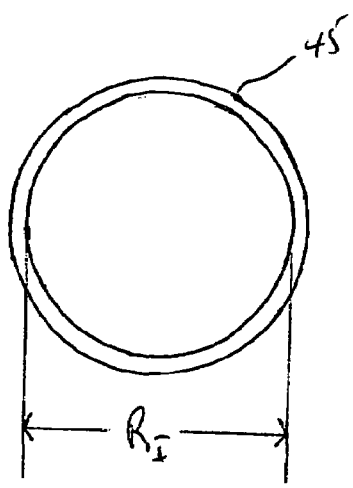
FIG. 5A is an elevational view of a cushioning O-ring used with the lamp holder and diffuser panel support.
Figure 5B:
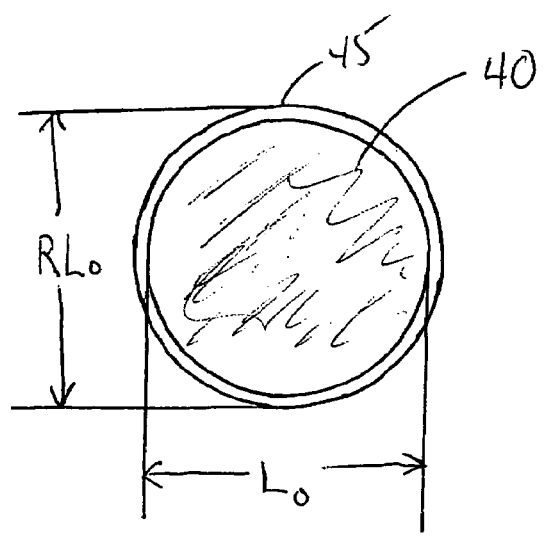
FIG. 5B is an elevational view of the cushioning O-ring and lamp.

Referring collectively to FIGS. 5A and 5B, cushioning O-rings 45 are disposed around the sections of the lamps 40, held by the LHDP supports 50. The cushioning O-rings 45 cushion the lamps 40 from external impact forces, thus, substantially preventing lamp breakage. The cushioning O-rings 45 may be made from a resilient, transparent material, such as transparent silicon rubber. The transparent O-rings 45 help to prevent dark spots in the images displayed by the LCD display panel. Each cushioning O-ring 45 may be formed to have an inner diameter $R_I$ which is sized to be slightly less that the outer diameter $L_O$ of the lamp, so that the cushioning O-ring 45 will stay in place around the lamp 40.

FIGS. 2 and 3 collectively show a first illustrative embodiment of the LHDP support 50. As shown, each LHDP support 50 comprises a first or lower member 100 and a second or upper member 200. The lower member 100 is configured for holding the lamp 40 and attaching it to the bottom wall 22 of the lamp housing 20 and the upper member 200 is configured for supporting the diffuser plate 60, when it attempts to sag or distort. As best shown in FIG. 4B, the lower member 100 includes a body 110 that may be circular as in the shown embodiment. In other embodiments, the body 110 may be square or rectangular, for example. The body 110 as shown may have a generally planar upper surface 120, a generally planar lower surface 130 and a cylindrical side wall surface 140 that extends between the upper and lower surfaces 120,130. A lamp retaining groove 150 is defined in the upper surface 120 of the body 110 and divides the cylindrical side wall 140 into opposing, resilient side wall sections 140a and 140b. As illustrated in FIG. 2, the retaining groove 150 has a diameter G which is sized to be approximately equal to the outer diameter $RL_O$ of the O-ring 45 (FIG. 5B) when surrounding a section of the lamp 40. As shown in FIG. 4C, the retaining groove 150 has a cross-sectional profile that may be somewhat greater than a semi-circle, i.e., somewhat greater than 180 degrees. This cross-sectional profile provides a groove opening width W that is slightly smaller than the diameter $RL_O$ of the cushioning O-ring surrounded lamp 40. Because the side wall sections 140a and 140b and O-ring 45 are resilient, the lamp 40 and corresponding cushioning O-ring 45 may be snap-fitted into the retaining groove 150. Overhanging portions 141a and 141b of respective side wall sections 140A and 140B securely retain the lamp 40 and corresponding cushioning O-ring 45 in the groove 150.

Referring again to FIG. 4B, opposing recesses 151a and 151b may be defined in the surface 151 of the retaining groove 150, adjacent to the upper surface 120 of the body 110. The recesses 151a, 151b receive locking members 260a, 260b of the corresponding upper member 200 of the LHDP support 50. The bottom of each recess 151a and 151b may include a respective locking aperture 152a and 152b. The locking apertures 152a, 152b receive opposing locking shoulders 261a, 261b of respective locking members 260a, 260b of the upper member 200.

A pair of resilient locking projections 160a and 160b depend from the lower surface 130 of the lower member body 110. The locking projections 160a and 160b include respective opposing locking protrusions 161a and 161b which snap fit into a corresponding locking aperture (not shown) in the bottom wall 22 of the lamp housing 20.

The lower member 100 of the LHDP support 50 may be made from a plastic material using conventional plastic forming methods, such as injection molding. The lower member 100 may be formed as a single, unitary member, or may be made in separate parts which are mechanically fastened, glued or otherwise secured to one another.

The lower member 100 of the LHDP support 50 may be coated with a reflective material using conventional methods, such as plastic plating. The reflective coating helps to prevent dark spots in the images displayed by the LCD display panel.

Figure 4A:
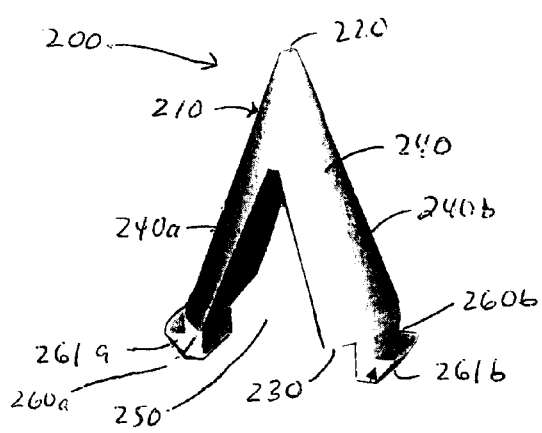
FIG. 4A is a perspective view of an upper member of the lamp holder and diffuser panel support shown in FIG. 2.
Figure 4B:
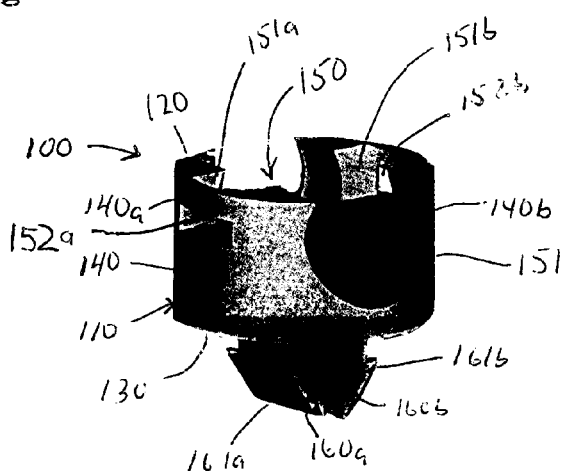
FIG. 4B is a perspective view of a lower member of the lamp holder and diffuser panel support shown in FIG. 2.
Figure 4C:
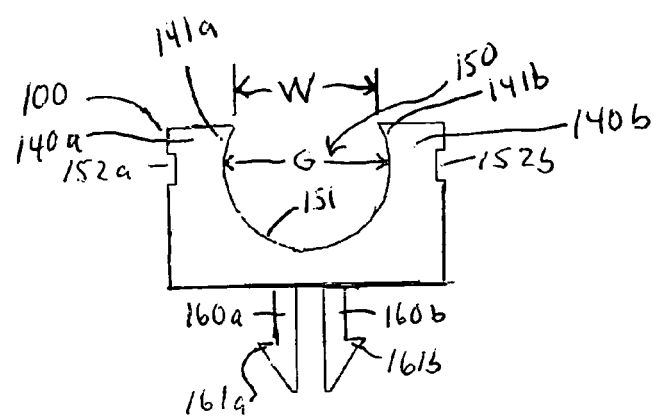
FIG. 4C is an elevational view of the lower member of the lamp holder and diffuser panel support shown in FIG. 2.

As best shown in FIG. 4A, the upper member 200 of the LHDP support 50 comprises an elongated body which may have an inverted frusto-conical 210 shape with an upper, generally planar contact wall 220, a lower, generally planar base wall 230, and a frusto-conical side wall 240 separating the contact and base walls 220, 230. An inverted V-shape groove 250, defined in the lower base wall 230, divides the conical side wall 240 into opposing wall sections 240a and 240b, which have sufficient rigidity to prevent the diffuser plate 60 from sagging into the lamp housing 20. The contact wall 220 of the upper member 200 is typically spaced a very small distance, e.g., about 0.3 mm to about 0.5 mm, from the lower surface of the diffuser plate 60. If the diffuser plate begins to sag, the lower surface thereof will contact the planar contact wall 220 of the upper member 200, and will not sag any further. The inverted V-shape groove 250 is provided to allow a space for the lamp 40 and the cushioning O-ring 45 seated below in the lower member 100 of the LHPD support 50.

The locking members 260a and 260b with their corresponding opposing locking shoulders 261a and 261b respectively, depend from side wall sections 240a and 240b respectively of the upper member body 210. The locking members 260a, 260b couple the upper member 200 of the LHDP support 50 to the lower member 100 of the LHDP support 50. When coupled, the upper member locking members 260a and 260b sit in the recesses 151a, 151b of the lower member 100 and the upper locking shoulders 261a, 261b of the upper member 200 extend through the locking apertures 151a, 151b of the lower member 100.

The upper member 200 of the LHDP support 50 may be made of a transparent material having the rigidity to support the diffuser plate 60. For example, the upper member 200 may be made from polymethylmethacrylate plastic or acrylic plastic using conventional plastic forming methods, such as injection molding. The transparent upper member 200 of the LHDP support 50 allows light to pass therethrough from the under lying lamp section, thus, helping to prevent dark spots in the images displayed by the LCD display panel. The upper member 200 may be formed as a single, unitary member, or may be made in separate parts which are mechanically fastened, glued or otherwise secured to one another.

Figure 6:
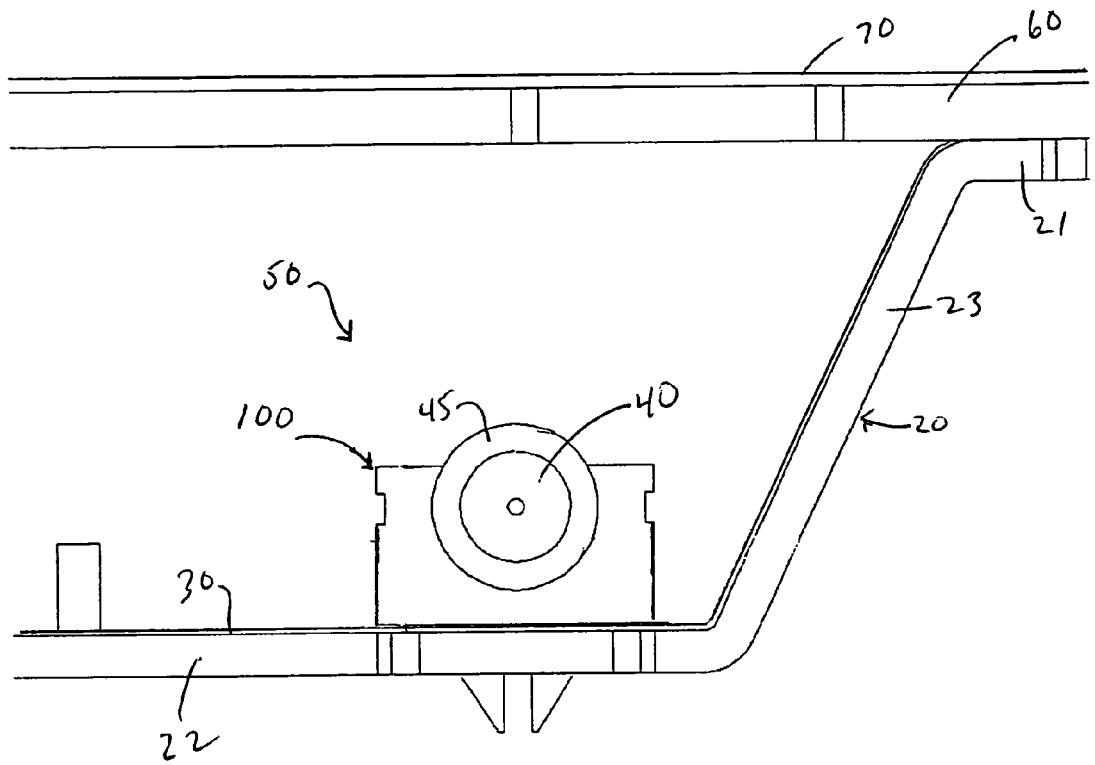
FIG. 6 is a sectional of the lamp housing of the backlight assembly illustrating the use of lower member of the lamp holder and diffuser panel support without the upper member.

As shown in FIG. 6, the lower member 100 of one or more of the LHDP supports 50 may be used without the upper member 200. For example, the upper members 200 of the LHDP supports 50 may be omitted in areas of the lamp housing 20 where diffuser plate 60 does no sag, but where a lamp holder is still needed to avoid lamp sagging and distortion.

Figure 7:
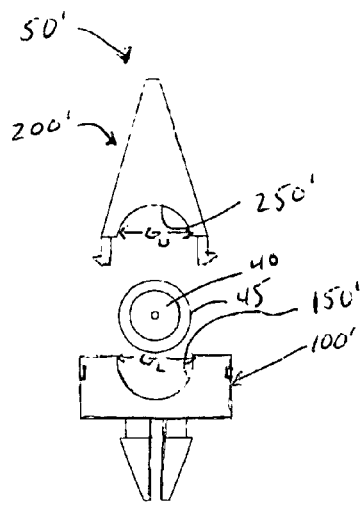
FIG. 7 is an exploded, elevational view of a second illustrative embodiment of the lamp holder and diffuser panel support.

FIG. 7 shows a second illustrative embodiment of the LHPD support 50'. The support 50' is substantially identical to the support 50 of the first illustrative embodiment, except, that the upper member 200' has a semi-circular retaining groove 250' with a cross-sectional profile of a semi-circle (instead of an inverted V-shape groove) and a diameter $G_U$ which is sized to be approximately equal to the outer diameter $D_O$ of the O-ring 45. The upper member 200' aids in retaining the lamp 40 in the groove 150' of the lower member 100'. The retaining groove 150' of the lower member 100' may have the cross-sectional profile (slightly greater than a semi-circle) that provides a groove opening width W that is slightly smaller than the diameter $R_O$ of the cushioning O-ring 45, or may have a cross-sectional profile of a semi-circle. In either embodiment, retaining groove 150' has a diameter $G_L$ which is sized to be approximately equal to the outer diameter $D_O$ of the O-ring 45.

It is to be understood that one skilled in the art may make many variations and modifications to the subject matter described herein. Any and all of such variations and modifications are intended to be within the scope of the invention as defined in the appended claims.

What is claimed is:

1. A support for use in a backlight assembly of a liquid crystal display panel, the support comprising:
   a first member having a body and a groove formed in the body for holding a lamp, the first member attaching the lamp to a lamp housing of the backlight assembly.
   a second member having an elongated body for supporting a diffuser plate of the backlight assembly when it attempts to sag or distort;
   wherein the second member extends from the first member and the groove of the first member is disposed beneath the second member.

2. The support according to claim 1, wherein the body of the first member includes a locking member depending therefrom for attaching the first member to the lamp housing of the backlight assembly.

3. The support according to claim 1, wherein the body of the second member comprises a frusto-conical shape.

4. The support according to claim 3, wherein the body of the second member includes a groove.

5. The support according to claim 4, wherein the groove of the body of the second member provides clearance for the lamp.

6. The support according to claim 4, wherein the groove of the body of the second member aids in retaining the lamp in the groove of the body of the first member.

7. The support according to claim 1, wherein the body of the second member includes a groove.

8. The support according to claim 7, wherein the groove of the body of the second member provides clearance for the lamp.

9. The support according to claim 7, wherein the groove of the body of the second member aids in retaining the lamp in the groove of the body of the first member.

10. The support according to claim 1, wherein the body of the first member includes a reflective surface.

11. The support according to claim 1, wherein the body of the second member is transparent.

12. The support according to claim 1, wherein the body of the second member includes a locking member.

13. The support according to claim 12, wherein the body of the first member includes a recess for the locking member.

14. The support according to claim 13, wherein the locking member includes a locking shoulder that extends through an aperture at a bottom of the recess.

15. The support according to claim 1, further comprising a ring-shape member disposed about a section of the lamp for providing cushioning between the lamp and the first member.

16. The support according to claim 1, wherein the groove of the body of the first member has a cross-sectional profile which is slightly greater than a semicircle.

17. The support according to claim 16, wherein the lamp snap-fits into the groove of the body of the first member.

18. The support according to claim 1, wherein the lamp snap-fits into the groove of the body of the first member.

19. A backlight assembly for a liquid crystal display panel, the backlight assembly comprising:
   a lamp housing;
   a lamp;
   a diffuser plate;
   a support comprising
      a first member having a body and a groove formed in the body for holding the lamp, the first member attaching the lamp to the lamp housing;
      a second member having an elongated body for supporting the diffuser plate when it attempts to sag or distort, the second member extending from the first member and the groove of the first member disposed beneath the second member.

20. The backlight assembly according to claim 19, wherein the body of the first member includes a locking member depending therefrom for attaching the first member to the lamp housing.

21. The backlight assembly according to claim 19, wherein the body of the second member comprises a frusto-conical shape.

22. The backlight assembly according to claim 21, wherein the body of the second member includes a groove.

23. The backlight assembly according to claim 22, wherein the groove of the body of the second member provides clearance for the lamp.

24. The backlight assembly according to claim 22, wherein the groove of the body of the second member aids in retaining the lamp in the groove of the body of the first member.

25. The backlight assembly according to claim 19, wherein the body of the second member includes a groove.

26. The backlight assembly according to claim 25, wherein the groove of the body of the second member provides clearance for the lamp.

27. The backlight assembly according to claim 25, wherein the groove or the body of the second member aids in retaining the lamp in the groove of the body of the first member.

28. The backlight assembly according to claim 19, wherein the body of the first member includes a reflective surface.

29. The backlight assembly according to claim 19, wherein the body of the second member is transparent.

30. The backlight assembly according to claim 19, wherein the body of the second member includes a locking member.

31. The backlight assembly according to claim 30, wherein the body of the first member includes a recess for the locking member.

32. The backlight assembly according to claim 31, wherein the locking member includes a locking shoulder that extends through an aperture at a bottom of the recess.

33. The backlight assembly according to claim 19, further comprising a ring-shape member disposed about a section of the lamp for providing cushioning between the lamp and the first member.

34. The backlight assembly according to claim 19, wherein the groove of the body of the first member has a cross-sectional profile which is slightly greater than a semi-circle.

35. The backlight assembly according to claim 34, wherein the lamp snap-fits into the groove of the body of the first member.

36. The backlight assembly according to claim 19, wherein the lamp snap-fits into the groove of the body of the first member.

* * * * *